(12) United States Patent
Dejima et al.

(10) Patent No.: US 7,695,150 B2
(45) Date of Patent: Apr. 13, 2010

(54) LIGHTING UNIT, DISPLAY DEVICE, AND PHOSPHOR FILM

(75) Inventors: Norihiro Dejima, Chiba (JP); Makoto Kurihara, Chiba (JP); Tomoki Fukuda, Chiba (JP)

(73) Assignee: Seiko Instruments Inc. (JP)

( * ) Notice: Subject to any disclaimer, the term of this patent is extended or adjusted under 35 U.S.C. 154(b) by 275 days.

(21) Appl. No.: 11/399,250

(22) Filed: Apr. 6, 2006

(65) Prior Publication Data

US 2006/0255711 A1 Nov. 16, 2006

(30) Foreign Application Priority Data

Apr. 12, 2005 (JP) ................. 2005-114516

(51) Int. Cl.
*F21V 9/16* (2006.01)

(52) U.S. Cl. ............... 362/84; 362/618; 362/231; 362/610; 362/615; 362/629; 313/486; 313/467; 313/503; 313/487; 313/501

(58) Field of Classification Search ............ 362/84, 362/618, 615, 627, 617, 231, 610, 624, 629; 313/112, 486, 467, 503, 487, 501
See application file for complete search history.

(56) References Cited

U.S. PATENT DOCUMENTS

| | | | |
|---|---|---|---|
| 5,219,606 A * | 6/1993 | Homma et al. ............. 427/65 |
| 5,739,879 A | 4/1998 | Tsai ......................... 349/62 |
| 6,419,854 B1 * | 7/2002 | Yocom et al. ......... 252/301.4 S |
| 7,126,567 B2 * | 10/2006 | Nishikawa ................. 345/77 |
| 7,255,469 B2 * | 8/2007 | Wheatley et al. ........... 362/609 |
| 7,361,938 B2 * | 4/2008 | Mueller et al. ............. 257/94 |
| 2003/0042845 A1 * | 3/2003 | Pires et al. ................ 313/501 |

FOREIGN PATENT DOCUMENTS

EP 323218 A1 * 7/1989

OTHER PUBLICATIONS

Patent Abstracts of China, publication No. CN 1170873C, publication date Oct. 13, 2004.
Patent Abstracts of China, publication No. CN 1566999A, publication date Jan. 19, 2005.

* cited by examiner

*Primary Examiner*—Sandra L O'Shea
*Assistant Examiner*—Jessica L McMillan
(74) *Attorney, Agent, or Firm*—Adams & Wilks (57) ABSTRACT

To provide a lighting unit which: does not greatly affect the design of a light guide plate; and has a long lifetime, high efficiency, and a wide color reproduction range by means of a phosphor. In view of the foregoing, the lighting unit of the present invention is constituted in such a manner that a phosphor bead or a phosphor film is arranged on at least one of the light irradiation plane of a light guide plate, the rear surface of the light guide plate, and the light incidence plane of the light guide plate. In addition, a phosphor film is constituted by using: a phosphor bead formed of a phosphor particle and a water-impervious material with which the phosphor particle is coated so that the particle is confined in the material; and a polymer film holding the phosphor bead.

6 Claims, 5 Drawing Sheets

LIGHTING UNIT, DISPLAY DEVICE, AND PHOSPHOR FILM

BACKGROUND OF THE INVENTION

1. Field of the Invention

The present invention relates to a liquid crystal display device used for a portable information equipment, a portable phone, and the like, a lighting unit such as a front light or a back light for irradiating a non-self light emitting display element with light, and for a phosphor bead or a phosphor film for converting a wavelength of light from a light source.

2. Description of the Related Art

Liquid crystal display devices providing high-definition color images at low power consumptions have been frequently used as display devices for recent portable phones, mobile computers, and the like. A light source employing a high-luminance white LED has been used as the light source for the lighting units, for illuminating liquid crystal devices used in those liquid crystal display devices.

In particular, a bright reflection type liquid crystal display device or a double-side visible type liquid crystal display device in which image information can be displayed on both front and rear surfaces, has been used in a portable phone. The white LED used for lighting such the display devices has such a construction that a resin having dispersed thereinto a green phosphor or a yellow phosphor is provided onto the light-emitting surface of a blue LED. As a result, green light or yellow light, and the original blue light are mixed, thereby being capable of obtaining white light.

Figure 15:
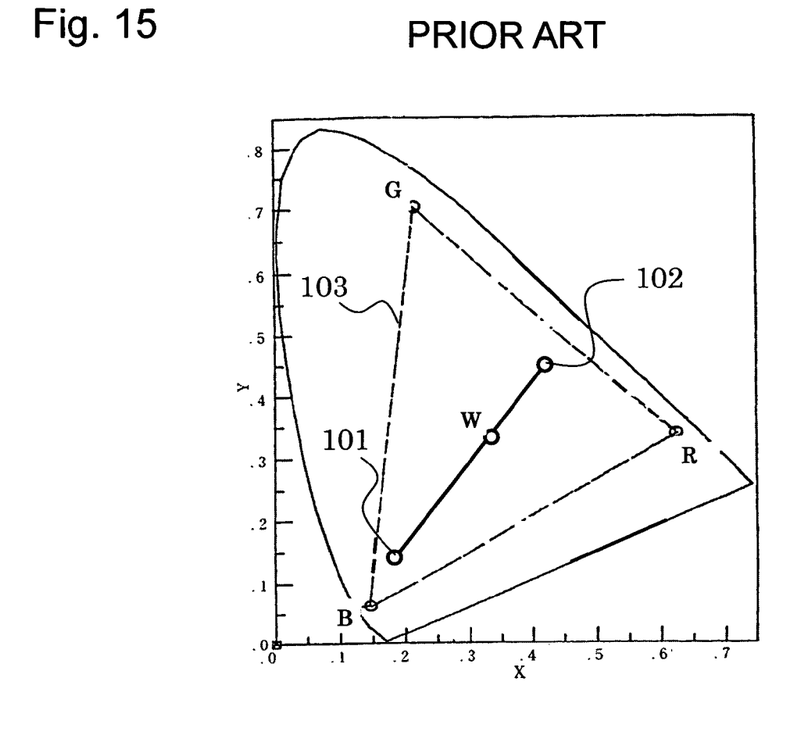
FIG. 15 is a chromaticity coordinate view explaining the color reproduction range of a lighting unit using a conventional white LED.

FIG. 15 is an XY chromaticity diagram explaining the color reproduction range of a conventional white LED. A color triangle obtained by connecting the points shown by R, G, and B in the figure is that of a color CRT. Adjusting the luminance of each of those R, G, and B pixels enables all the colors present inside the color triangle to be represented. When the area of the color triangle of the color CRT is set to 100%, the area of a color triangle possessed by a color display device except a CRT is defined as an NTSC ratio, and the ratio is an indicator for color reproducibility. The conventional white LED can reproduce a color only on a straight line connecting chromaticity coordinates 101 of only a blue LED with excitation light and chromaticity coordinates 102 of only yellow light obtained by wavelength conversion, so a color reproduction range is extremely narrow. Of course, a yellow phosphor can reproduce a red color and a green color (although the chroma of each of the colors is low) as well as a yellow color because a green light component and a red light component are also produced by wavelength conversion. An oxide phosphor such as yttrium aluminum garnet (YAG) added with a rare earth element or a chalcogenide compound has been frequently used as a phosphor.

Meanwhile, the intensity of light applied to a phosphor is large when the phosphor is used in the same manner as in the conventional white LED. JP 07-176794 A (Patent Document 1) discloses that a phosphor is applied to and formed on the rear surface of a light guide plate at a predetermined formation density with a view to preventing the light degradation of the phosphor.

Furthermore, JP 10-269822 A (Patent Document 2) discloses that a laminar wavelength converter is arranged between a blue LED and the light incidence plane of a light guide plate so that wavelength conversion can be performed by means of a phosphor with a lower area than that in the method disclosed in the above patent document.

However, a conventional oxide phosphor has a problem in that light conversion efficiency is low. The use of the so-called chalcogenide compound such as a sulfide, a selenide, or a telluride each having high light conversion efficiency for solving the problem involves the emergence of a new problem in that it is difficult to lengthen the lifetime of each of these phosphors owing to the poor moisture resistance of each of the phosphors.

In addition, a conventional lighting unit in which a conventional blue LED, and a green phosphor or a yellow phosphor are combined to provide white light has a problem in that a color reproduction range is narrow owing to a reduction in luminous intensity of a red color.

In addition, a conventional lighting unit in which a phosphor is applied to the rear surface of a light guide plate has a problem in that application conditions must be conformed every time the specifications of the light guide plate are changed because an application concentration must be conformed to a light intensity distribution inside the light guide plate. Furthermore, applying the phosphor to the rear surface of the light guide plate involves the emergence of a problem in that it becomes difficult to design the light guide plate because light propagation property inside the light guide plate changes.

Furthermore, a conventional lighting unit in which a laminar wavelength converter is arranged between a light source and the light incidence plane of a light guide plate has a problem in that color mixing property is bad because a distance between the light source and the wavelength converter is so short that the intensity distribution of light applied to the wavelength converter is large.

SUMMARY OF THE INVENTION

In view of the foregoing, an object of the present invention is to provide a phosphor film and a lighting unit each of which: does not greatly affect the design of a light guide body; and has high efficiency, a long lifetime, and a wide color reproduction range.

A lighting unit of the present invention comprises: a light source; a light guide plate through which light from the light source propagates so that the light is applied in a planar fashion; and a phosphor layer including a phosphor bead formed by coating a surface of a phosphor particle with a hydrophobic material and a base material holding the phosphor bead, wherein the phosphor layer is arranged on at least one of a light irradiation plane of the light guide plate, a rear surface of the light guide plate, and a light incidence plane of the light guide plate.

The phosphor layer can be formed by printing the base material into which the phosphor bead is dispersed on the light emission plane of the light guide plate. In addition, the area density of the phosphor bead dispersed into the base material is inversely proportional to the radiant intensity distribution of the light source.

Here, the phosphor layer is mixed with a second phosphor bead formed by coating the surface of a second phosphor having a luminous wavelength different from that of a phosphor particle with a hydrophobic material at a predetermined ratio.

In addition, a blue light source is used as the light source, and the phosphor layer is constituted by using a red phosphor layer converting blue light into red light and a green phosphor layer converting blue light into green light.

Alternatively, the blue light source is used as the light source, the green phosphor layer and the red phosphor layer are arranged on at least one of the rear surface of the light guide plate and the light emission plane of the light guide plate, and a hologram a surface of which is irradiated with light propagating inside the light guide plate is arranged on one of the rear surface of the light guide plate and the light emission plane of the light guide plate.

Alternatively, an ultraviolet light source and a blue light source are each used as the light source, and the phosphor layer is constituted by using a green phosphor film converting ultraviolet light into green light and a red phosphor film converting ultraviolet light into red light.

In addition, a phosphor bead emitting light having a shorter wavelength of the phosphor bead and the second phosphor bead is arranged to be closer to the light source than the other phosphor bead.

Further, a light pipe through which light from the light source propagates so that the light is applied in a linear fashion is arranged on a side of the light incidence plane of the light guide plate; the phosphor layer is arranged in the light pipe; and the phosphor layer is mixed with the phosphor bead and a second phosphor bead formed by coating a surface of a second phosphor having a luminous wavelength different from that of the phosphor particle with a hydrophobic material at a predetermined ratio.

Alternatively, a light pipe through which light from the light source propagates so that the light is applied in a linear fashion is arranged on a side of the light incidence plane of the light guide plate; the phosphor bead is dispersed into the light pipe; and a phosphor film containing a second phosphor bead formed by coating a surface of a second phosphor having a luminous wavelength different from that of the phosphor particle with a hydrophobic material is arranged between the light pipe and the light incidence plane of the light guide plate.

Furthermore, a display device of the present invention includes: a non-self light emitting display element; and a lighting unit having any one of the above constitutions for lighting the display device.

In addition, a phosphor film of the present invention is constituted by using a phosphor bead formed by coating the surface of a phosphor particle with a hydrophobic material and a polymer film holding the phosphor bead. At this time, the phosphor bead may be dispersed into the polymer film, or may be held on the polymer film via a binder. At this time, multiple phosphor beads may be arranged in the form of a single layer on the polymer film in such a manner that the beads do not overlap each other. Furthermore, the phosphor film is mixed with a translucent bead containing no phosphor at a predetermined ratio. In addition, the phosphor film can be mixed with a second phosphor bead formed by coating the surface of a second phosphor having a luminous wavelength different from that of a phosphor particle with a hydrophobic material at a predetermined ratio.

DETAILED DESCRIPTION OF THE PREFERRED EMBODIMENTS

The phosphor film of the present invention is constituted by using: a phosphor bead formed of a phosphor particle and a water-impervious material with which the phosphor particle is coated so that the particle is confined in the material; and a polymer film holding the phosphor bead.

In order that the phosphor bead may be held on the polymer film, the phosphor bead is dispersed into a transparent polymer base material so that the transparent polymer base material is turned into a film, or the phosphor bead is applied to and formed on the polymer film via a polymer binder or an inorganic binder. Thus, a long-lifetime phosphor film that deteriorates little owing to moisture can be realized even when a chalcogenide compound is used as the phosphor particle.

The phosphor bead may contain one phosphor particle, or may contain two or more particles. When the phosphor bead contains one phosphor particle, the available average particle size of the phosphor particle is about 5 nm to 50 μm. When multiple phosphor particles are mixed in the phosphor bead, the maximum value for the average particle size of the phosphor particles is preferably about one fifth the particle size of the phosphor bead or less.

In addition, the lighting unit of the present invention includes: a light source; and a light guide plate through which light from the light source propagates so that the light is applied in a planar fashion, and a phosphor layer having any one of the above constitutions is arranged on at least one of the light irradiation plane of the light guide plate, the rear surface of the light guide plate, and the light incidence plane of the light guide plate.

In addition, a blue light source and a green light source are each used as the light source, and a red phosphor layer converting blue light into red light and a green phosphor layer converting blue light into green light are formed so as to be spatially separated from each other. Furthermore, a phosphor layer emitting light having a shorter wavelength of the two kinds of phosphor layers is arranged to be closer to the light source than the other phosphor layer. Each of those phosphor layers holds a phosphor bead formed by coating a corresponding phosphor particle with a water-impervious material. Such constitution enables efficient wavelength conversion without any change in propagation property of the light guide plate. In addition, phosphor beads or phosphor films are arranged so as to be spatially separated from each other, whereby a phosphor having reduced wavelength conversion efficiency can be arranged near the light source. As a result, color conversion efficiency for each color can be maximized.

In addition, an ultraviolet light source and a blue light source are each used as the light source, and the phosphor layer is constituted by a green phosphor layer converting ultraviolet light into green light and a red phosphor layer converting ultraviolet light into red light. The green/red phosphor layer holds a green/red phosphor bead formed by coating a green/red phosphor particle with a water-impervious material. Such constitution realizes green light emission and red light emission with high luminous efficiency, and mixing green light, red light, and blue light provides a lighting unit having a wide color reproduction range.

In addition, the phosphor layer was formed by printing/applying a light-emitting layer obtained by dispersing the phosphor bead into a polymer binder or an inorganic binder on/to a transparent substrate. Then, the phosphor-printed or -applied layer was formed by mixing a first phosphor bead and a second phosphor bead and by dispersing the mixture into a polymer base material. Thus, the use of only one phosphor layer enabled wavelength conversion into multiple colors.

In addition, nearly a single layer of each of the first phosphor bead and the second phosphor bead each mixed with a translucent bead containing no phosphor at a predetermined ratio was formed on a transparent film by means of a binder such as a polymer binder or an inorganic binder. Such constitution enabled blue light emitted from the light source to be introduced to a light emission plane with no influence by the phosphor. At this time, reductions in sizes of regions where the respective phosphors were formed and the bringing of the regions close to each other were attained, whereby color mixing property was improved and wavelength conversion with no color unevenness was enabled.

Furthermore, the area density of the phosphor bead was designed so as to be proportional to a required light intensity. As a result, a lighting unit having a uniform color mixing ratio was obtained.

Meanwhile, in another method involving the use of a phosphor bead, the first phosphor bead and the second phosphor bead were mixed at a predetermined ratio, and the mixture was dispersed into a light pipe through which light from the light source propagated so that the light incidence plane of the light guide plate would be irradiated with the light in a linear fashion before wavelength conversion and color mixing were performed simultaneously in the light pipe. Mixing and dispersing phosphors into the light pipe enabled wavelength conversion at uniform, strong light intensity, and improved wavelength conversion efficiency. An improvement in color mixing property of light was also attained because the light from the light source repeated multiple reflection in the light pipe to form uniform light intensity.

Furthermore, a phosphor film and the light pipe were used in combination. This structure is as described below: the first phosphor bead is dispersed into the light pipe through which light from the light source propagates so that the light incidence plane of the light guide plate is irradiated with the light in a linear fashion, and the phosphor film on/to which the second phosphor bead is printed/applied is arranged between the light pipe and the light incidence plane of the light guide plate. This structure enabled the phosphor to be uniformly dispersed into the light pipe, and enabled color conversion with improved uniformity. In addition, the intensity of light applied to the phosphor layer also became uniform. As a result, the uniform application of the phosphor to the phosphor layer was attained, whereby the production of the phosphor layer was facilitated.

Alternatively, the first phosphor bead and the second phosphor bead may be directly arranged on the light emission plane of the light guide plate. In addition, the arrangement can reduce the number of components of the lighting unit of the present invention.

In addition, the display device of the present invention includes a lighting unit having any one of the above-described constitutions and a non-self light emitting display element arranged on the side of the light irradiation plane of the lighting unit.

Hereinafter, examples of the present invention will be described specifically with reference to the drawings.

EXAMPLE 1

Figure 1:
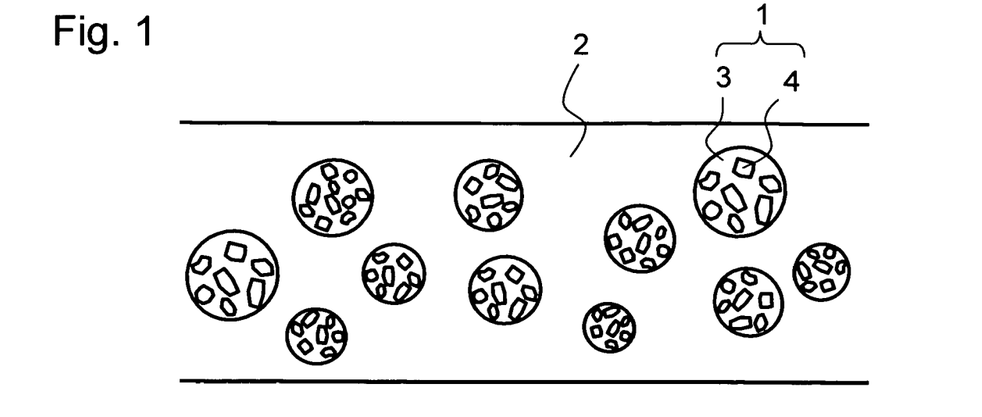
FIG. 1 is a schematic sectional view showing the constitution of a phosphor film according to the present invention.

FIG. 1 is a sectional view schematically showing the constitution of a phosphor film of this example. As shown in the figure, phosphor beads 1 are mixed and dispersed into a transparent base material 2 such that the phosphor beads overlap one another in the thickness direction of the phosphor film. Each of the phosphor beads 1 is formed by coating phosphor particles 4 with a water-impervious material 3, and is of a substantially spherical shape. At this time, the transparent base material 2 is of a film shape. A polymer material such as a silicone resin or a cycloolefin-based resin, or an inorganic material such as silicon dioxide or glass can be used as the water-impervious material 3. When the above inorganic material is used as the water-impervious material 3, the material 3 can be formed by growing the inorganic material around the phosphor particles 4 by means of a well-known sol-gel method. A polymer material such as an acrylic resin, a silicone resin, an epoxy resin, polycarbonate, or a cycloolefin resin, or an inorganic material such as silicon dioxide can be used as the transparent base material 2. When an inorganic material such as silicon dioxide is used as the transparent base material 2, the base material can be obtained by: mixing and dispersing the phosphor beads 1 into a silica sol; applying the resultant to a flat plate; and curing the resultant under heat. YAG phosphor fine particles each containing a rare earth element or chalcogenide compound phosphor fine particles can be used as the phosphor particles. In particular, chalcogenide phosphor fine particles each have high luminous efficiency, but each have large hygroscopicity, so the properties of many of the particles deteriorate owing to moisture absorption. As shown in the present invention, the chalcogenide phosphor fine particles are coated with a water-impervious material before they are incorporated into a bead. As a result, the deterioration due to moisture absorption is eliminated, and hence the prolongation of a lifetime is realized.

In this example, a large number of the phosphor particles 4 are mixed in each of the phosphor beads 1. The average particle size of the phosphor particles 4 is 5 nm to 10 µm; the average particle size is sufficiently small as compared to the diameter of the bead. To be specific, the average particle size is preferably about one fifth the bead diameter or less. An average particle size larger than about one fifth the bead diameter is not preferable because part of the phosphor particles lie off the bead to deteriorate owing to moisture absorption.

Red phosphor particles each of which is excited with blue light to emit red light are coated with a water-impervious material to form a red bead. Green phosphor particles each of which is excited with blue light to emit green light are coated with a water-impervious material to form a green phosphor bead. The beads are mixed at a predetermined ratio to produce the phosphor film shown in FIG. 1. Irradiating the phosphor film with blue light can provide a luminescent color having target chromaticity. A color reproduction range provided by the luminescent color can be arbitrarily controlled by adjusting materials to be used for red and green phosphor particles, a mixing ratio between the particles, the mixing concentration of the respective phosphor particles, the average particle size of the respective phosphor particles, and the temperature of the blue light applied to the phosphor film.

EXAMPLE 2

Figure 2:
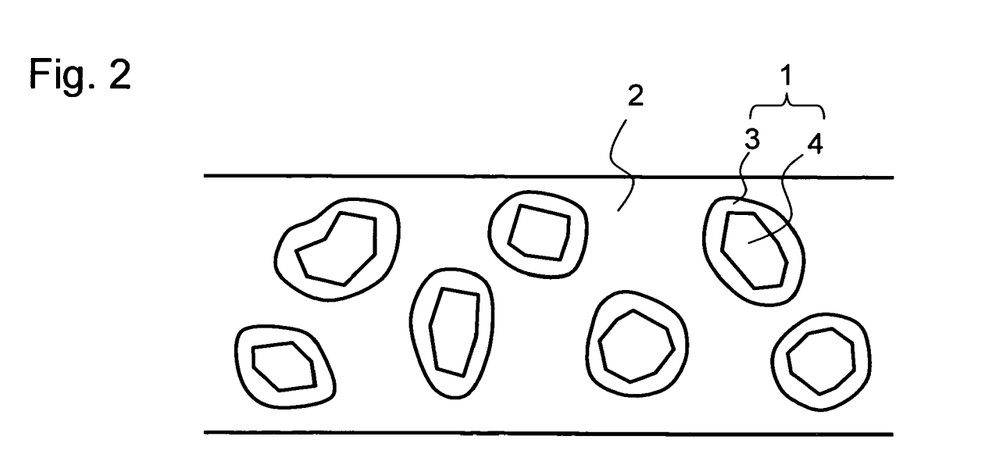
FIG. 2 is a schematic sectional view showing the constitution of the phosphor film according to the present invention.

FIG. 2 schematically shows the sectional constitution of a phosphor film of this example. This example is different from Example 1 in that the phosphor particles 4 are individually coated with the water-impervious material 3 so that each phosphor bead 1 has only one phosphor particle 4. In this case as well, the same phosphor particles and water-impervious material as those of Example 1 can be used. In the case where the phosphor particles 4 are coated individually with the water-imperious material 3, phosphor particles having a large average particle size (about 50 μm) can be used in forming the phosphor beads 1. The maximum particle size of many commercially available phosphor particles is about 10 to 50 μm, so the use of the phosphor beads of this example increases the degree of freedom in selection of materials for phosphor particles, and facilitates the design of a luminescent color.

In addition, the phosphor beads 1 each structured as shown in this example allow the cladding thickness of the water-impervious material 3 to be arbitrarily controlled, and allow any one of the phosphor particles to be completely coated with the water-impervious material. Therefore, the lifetime of light-emitting property possessed by each phosphor particle can be prolonged.

In the same manner as in Example 1, red phosphor particles each of which emits red fluorescence by means of blue light are coated with a water-impervious material to form a red phosphor bead. Green phosphor particles each of which emits green fluorescence by means of blue light are coated with a water-impervious material to form a green phosphor bead. The beads are mixed at a predetermined ratio to produce the phosphor film shown in FIG. 2 in which at least some of the phosphor beads 1 overlap one another in the thickness direction of the phosphor film. Irradiating the phosphor film with blue light can provide a luminescent color having target chromaticity. A color reproduction range provided by the luminescent color can be arbitrarily controlled by adjusting materials to be used for red and green phosphor particles, a mixing ratio between the phosphor beads, the average particle size of the respective phosphor particles, and the temperature of the blue light applied to the phosphor film.

EXAMPLE 3

Figure 3:
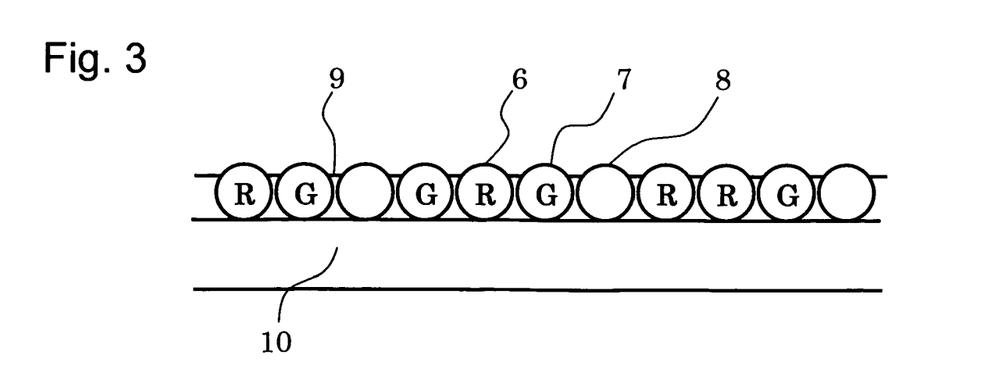
FIG. 3 is a schematic sectional view showing the constitution of the phosphor film according to the present invention.

Next, FIG. 3 schematically shows the sectional view of a phosphor film according to this example. In this example, red phosphor beads 6 and green phosphor beads 7 described in the above examples, and translucent beads 8 each containing no phosphor in it are simultaneously present on a transparent film 10 in such a manner that they bind together with the aid of a binder 9 to form a single layer. As in the case of Example 1 or 2, a mixing ratio among the phosphor beads is adjusted depending on the chromaticity of a luminescent color which one attempts to obtain through color mixing. The translucent beads 8 can be produced by means of a sol-gel method using a polymer resin such as a styrene resin or an acrylic resin, or an inorganic material such as silicon dioxide or glass.

The phosphor film is produced by, for example, applying a UV curable adhesive as the binder 9 to the transparent film 10 formed of a polyethylene resin, an acrylic resin, or a cycloolefin-based resin by means of printing, a roll coater, a doctor blade, or the like. The thickness of the UV curable adhesive to be applied is preferably thinner than the average particle size of the phosphor beads or of the translucent beads. The UV curable adhesive thus applied is irradiated with ultraviolet light for a predetermined time period so that the adhesive is temporarily cured. After that, the red phosphor beads 6, the green phosphor beads 7, and the translucent beads 8 sufficiently mixed at a predetermined ratio are pressed against the surface of the adhesive by means of a squeegee or the like so that the beads are developed into substantially a single layer, and then the beads are embedded in the UV curable adhesive. After that, the adhesive is irradiated with ultraviolet light again, and, at the same time, heated so that the embedded beads are fixed.

In addition to the UV curable adhesive, an ordinary thermosetting adhesive, air-setting adhesive, tackifier, or the like can be used as the binder 9 as long as it is translucent.

When the translucent beads 8 are mixed with the red phosphor beads 6 and the green phosphor beads 7 before use, blue light as excitation light that has passed through the translucent beads 8 can be directly used as illumination light. Accordingly, the color purity of the blue light can be increased. In addition, mixing the translucent beads 8 with the red phosphor beads 6 and the green phosphor beads 7 allows the beads to be fixed uniformly on the transparent film 10 with no formation of an empty region. As a result, a phosphor film with small color unevenness can be realized.

EXAMPLE 4

Figure 4:
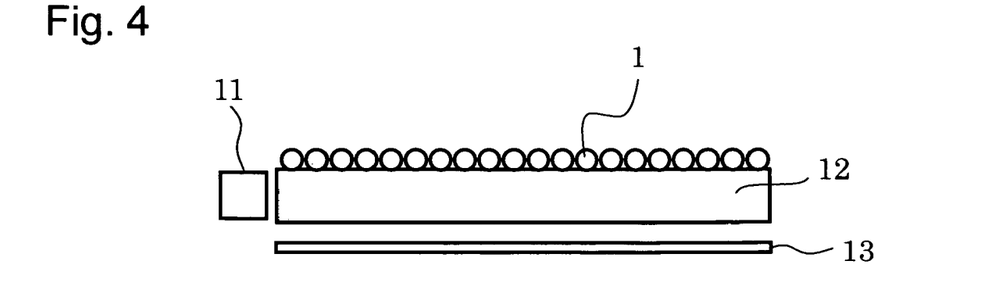
FIG. 4 is a schematic sectional view showing the constitution of a lighting unit according to the present invention.

FIG. 4 schematically shows the section of a lighting unit of this example. Blue light emitted from a light source 11 propagates inside a light guide plate 12, and is deflected or refracted by a group of fine prisms formed on the rear surface of the plate to change its optical path. Part of the light comes out of the rear surface, and is reflected by a light reflecting plate 13. Other part of the light is directly emitted from the light emission plane of the light guide plate 12. Here, the phosphor beads 1 are applied to the light emission plane of the light guide plate 12. As described above, the phosphor beads 1 are fixed to the surface of the light emission plane of the light guide plate 12 by means of a binder as in the case of Example 3. The phosphor beads 1 are obtained by mixing red phosphor beads, green phosphor beads, and translucent beads. Therefore, part of the blue light that has been emitted from the light emission plane of the light guide plate 12 and has passed through the red phosphor beads undergoes wavelength conversion by the red phosphor in the beads so that red light is emitted. In addition, part of the blue light that has been emitted from the light emission plane of the light guide plate 12 and has passed through the green phosphor beads undergoes wavelength conversion by the green phosphor in the beads so that green light is emitted. On the other hand, the blue light that has passed the translucent beads is emitted as it is. Thus, illumination light having desired color coordinates can be produced.

An action on the color conversion of illumination light in this example is similar to that shown in Example 3. In this example, the phosphor beads are directly formed on the light emission plane of the light guide plate. Accordingly, the number of parts can be reduced as compared to another example of a lighting unit to be described later.

Figure 16:
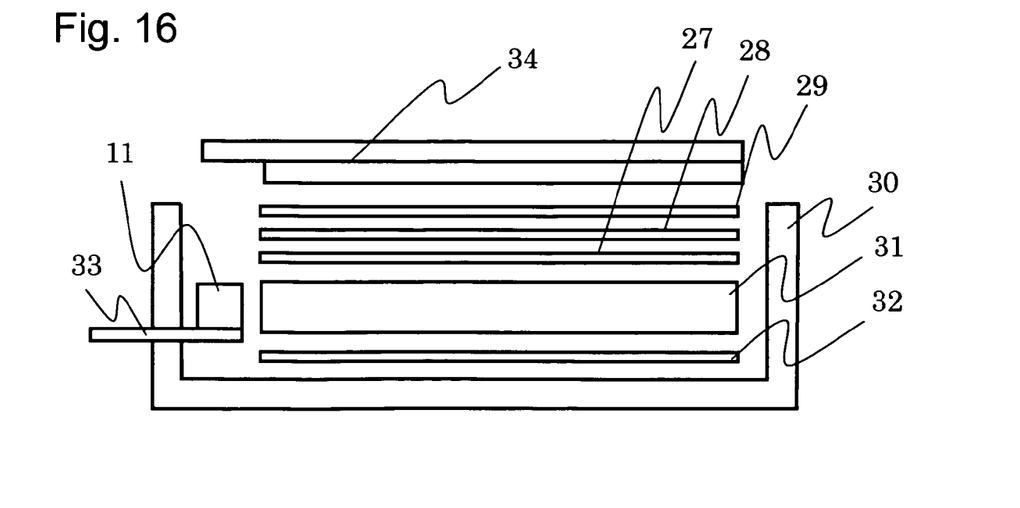
FIG. 16 is a schematic sectional view showing the entire constitution of the lighting unit of the present invention.

FIG. 16 schematically shows the section of a liquid crystal display device having the lighting unit. A diffusion sheet 27, prism sheets 28 and 29, and a liquid crystal panel 34 are arranged above a lighting unit 31. A reflection sheet 32 is arranged below the lighting unit 31. All the components are fixed in a casing 30.

EXAMPLE 5

Figure 5:
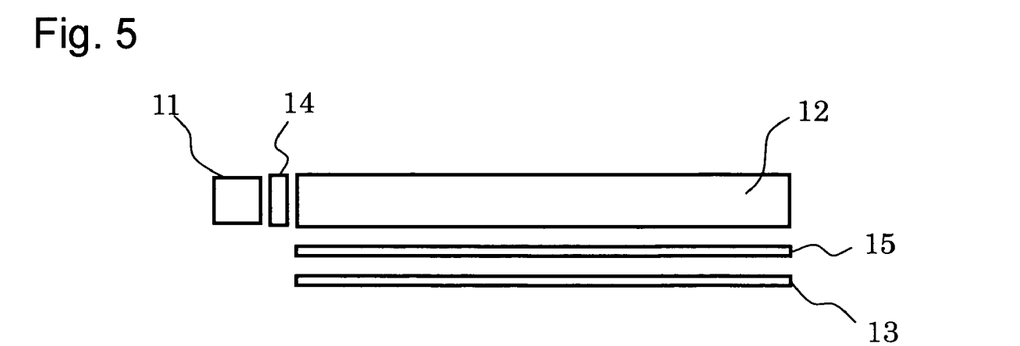
FIG. 5 is a schematic sectional view showing the constitution of the lighting unit according to the present invention.

FIG. 5 is a sectional view schematically showing the constitution of a lighting unit of this example. A first phosphor film 14 is arranged between the light incidence plane of the light guide plate 12 and the light source 11. A second phosphor film 15 is arranged between the light guide plate 12 and the reflecting plate 13. The light source 11 is a blue LED, and two or more light sources are typically arranged on the light incidence plane of the light guide plate 12. In addition, the light guide plate 12 is formed of a transparent polymer such as an acrylic resin, a polycarbonate resin, or a cycloolefin-based resin, and takes in light from the light source 11 from the light incidence plane so that the light propagates inside the plate. In general, a group of fine prisms or a fine scattering structure is formed on the light incidence plane or rear surface of the light guide plate 12, and is irradiated with uniform light from the light incidence plane on the plane. In the example shown in FIG. 5, a group of fine prisms is formed on the rear surface of the light guide plate 12, and the rear surface is irradiated with light propagating inside the plate at a predetermined ratio. The light emitted from the rear surface is reflected by the reflecting plate 13, passes through the light guide plate 12 again, and is emitted from the light emission plane of the light guide plate 12. A polymer substrate onto which Al, Ag, an alloy of Ag and Pd, or the like is deposited from the vapor to form a reflecting layer, a transparent polymer substrate into which a white pigment having high reflectance is mixed, or the like can be used as the reflecting plate 13.

The first phosphor film 14 and the second phosphor film 15 are transparent films having only phosphor beads having luminescent colors different from each other applied to their surfaces or mixed into them. When excitation wavelengths are the same, wavelength conversion efficiency reduces as the wavelength of light obtained as a result of wavelength conversion is lengthened. Therefore, when one attempts to obtain conversion light beams having the same light intensity, the intensity of irradiation light must be increased as a conversion wavelength is lengthened. Therefore, arranging a red phosphor film near the light source 11 enables blue light to be converted into red light efficiently. In addition, the absorption coefficient of the transparent polymer material of which the light guide plate 12 is formed with respect to red light is smaller than those with respect to green light and blue light. Accordingly, the loss of red light prior to irradiation can be reduced even when an optical path after conversion is lengthened. On the other hand, a green phosphor that performs wavelength conversion from blue light to green light has good wavelength conversion efficiency. Accordingly, the green phosphor is used as the second phosphor film 15 to perform wavelength conversion in a state where the rear surface of the light guide plate 12 is uniformly irradiated with light.

Any one of those described in Examples 1 to 3 can be used as the specific constitution of the phosphor film of this example; provided that, in this example, the first phosphor film 14 is mixed with only red phosphor beads, or red phosphor beads and translucent beads at a predetermined ratio, and the second phosphor film 15 is mixed with only green phosphor beads, or green phosphor beads and translucent beads at a predetermined ratio.

Figure 11:
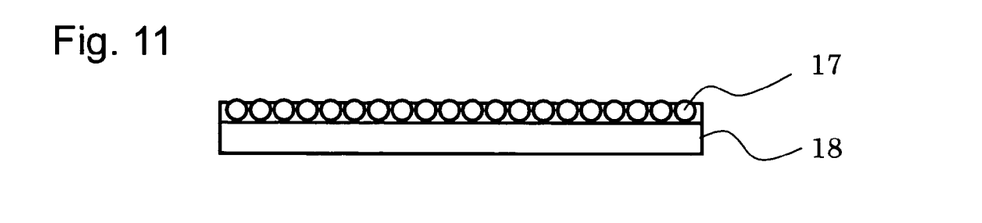
FIG. 11 is a detailed sectional view showing the constitution of a phosphor film used in the lighting unit according to the present invention.
Figure 12:
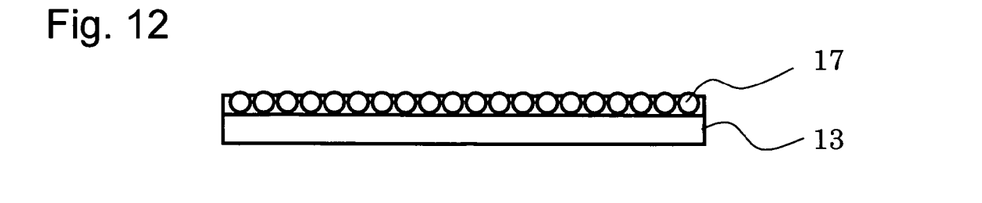
FIG. 12 is a detailed sectional view showing the constitution of the phosphor film used in the lighting unit according to the present invention.

FIGS. 11 and 12 are views each explaining a phosphor film in detail. In FIG. 11, phosphor beads 17 are formed in the form of a single layer on a transparent film 18. In this case, as in the case of the first phosphor film 14 shown in FIG. 15, the phosphor beads can be arranged between the light source 11 and the incidence plane of the light guide plate 12, or, as in the case of the second phosphor film 15, the phosphor beads can be arranged on the reflecting plate 13. On the other hand, in FIG. 12, the phosphor beads 17 are directly arranged on the reflecting plate 13. The use of this structure enables the second phosphor film 15 and the reflecting plate 13 shown in FIG. 5 to be formed of the same part, thereby enabling a reduction in number of parts of a lighting unit.

Figure 14:
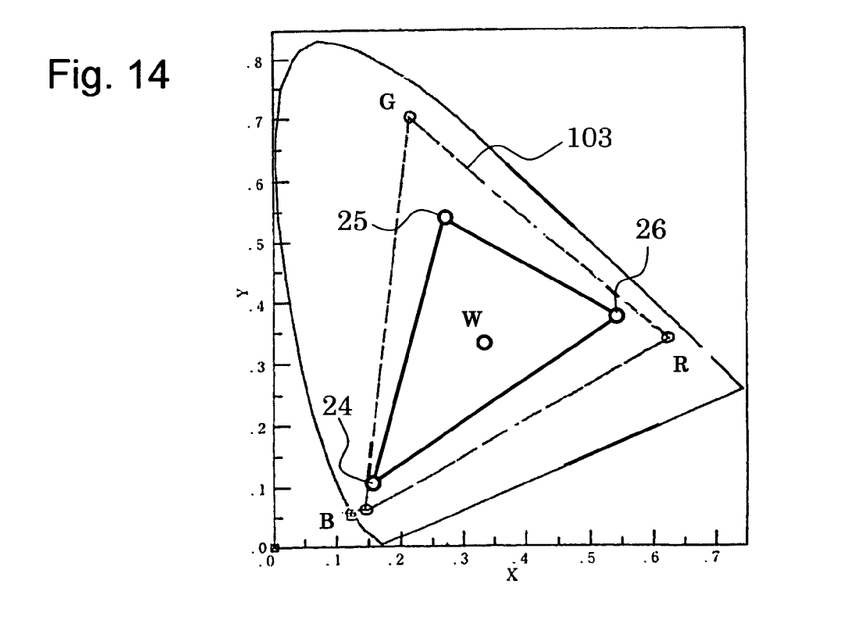
FIG. 14 is a chromaticity coordinate view explaining the color reproduction range of the lighting unit of the present invention.

FIG. 14 shows an XY chromaticity diagram for explaining the color reproduction range of the lighting unit of the present invention. In the lighting unit of the present invention, color coordinates 24 provided by blue light from a light source, color coordinates 25 provided by green light, and color coordinates 26 provided by red light form a color triangle. The mixing of those colors enables a color inside the color triangle to be arbitrarily represented. Although the color triangle is smaller than the color triangle 103 of a conventional color CRT, the color triangle is sufficiently large as compared to the color triangle of a lighting unit using a conventional white LED, so a color reproduction range is expanded.

It is needless to say that the lighting unit described in this example is often constituted by arranging, for example, a light scattering plate or a prism sheet on the light emission plane of the light guide plate 12 for controlling the luminance distribution or radiation angle of illumination light.

EXAMPLE 6

Figure 6:
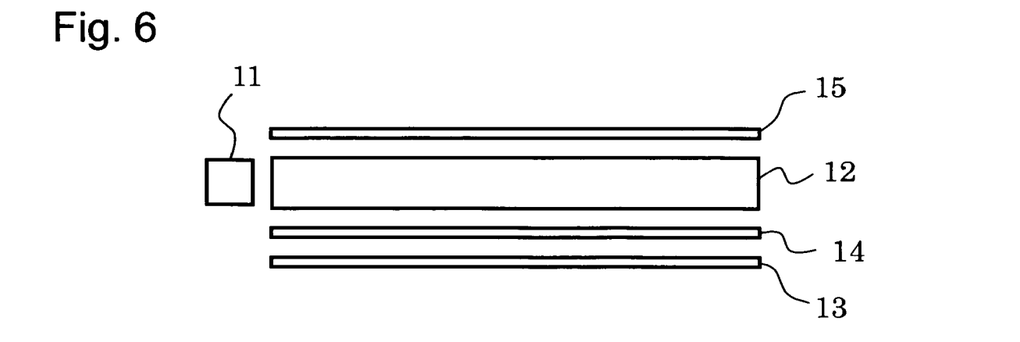
FIG. 6 is a schematic sectional view showing the constitution of the lighting unit according to the present invention.

FIG. 6 schematically shows the constitution of a lighting unit of this example. In this example, the first phosphor film 14 was arranged on the rear surface of the light guide plate 12, and the second phosphor film 15 was arranged on the front surface of the light guide plate 12. A blue LED having a luminous wavelength of 460 nm was used as the light source 11. Then, sulfide-based red phosphor beads each having a luminous wavelength of 615 nm were used as red phosphor particles in the first phosphor film 14, and oxide-based green phosphor beads each having a luminous wavelength of 522 nm were used as green phosphor particles in the second phosphor film 15. Such constitution provided a lighting unit having a wide color representation range. In addition, blue light passing through the first phosphor film 14 is used twice: irradiation light from the side of the light guide plate 12 and reflected light from the side of the reflecting plate 13. Accordingly, the concentration of phosphor beads to be incorporated into the first phosphor film 14 can be reduced by one-half as compared to the case where blue light is subjected to wavelength conversion only once.

In addition, in this example, light propagating inside the light guide plate 12 is substantially only blue light, so the structure of the light guide plate 12 can be easily designed in such a manner that light is applied from the light emission plane of the plate. Thus, illumination efficiency is improved, and the design is available on a reduced lead time. Furthermore, a hologram can be used as means for taking light propagating inside the light guide plate 12 to the outside so that the light is applied instead of a group of fine prisms or a fine scattering structure on the light emission plane or rear surface of the light guide plate. The hologram can be easily produced by transferring a pattern obtained as a result of a two-beam interference fringe by means of lithography, or by forming a computer-generated hologram such as a Lippman-type hologram by means of lithography. In addition, the first phosphor film 14 can be directly formed on the reflection plane of the reflecting plate 13.

EXAMPLE 7

Figure 7:
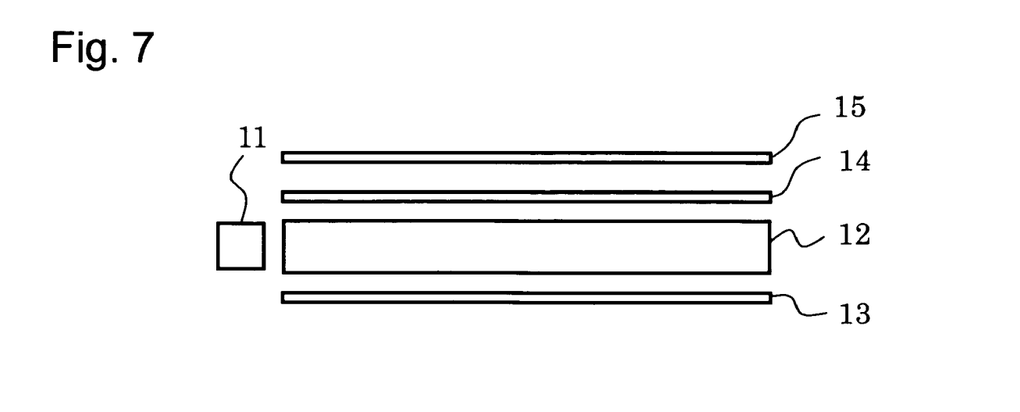
FIG. 7 is a schematic sectional view showing the constitution of the lighting unit according to the present invention.

FIG. 7 schematically shows the sectional structure of a lighting unit of this example. This example is different from Example 6 in that both the first phosphor film 14 and the second phosphor film 15 are arranged on the side of the light emission plane of the light guide plate 12. The light intensity distribution of light emitted from the light guide plate 12 has a uniformity of 70% or more. Accordingly, such arrangement was able to uniformize light emission obtained as a result of wavelength conversion by the first phosphor film 14 and the second phosphor film 15, and was able to improve color mixing property. Furthermore, the use of the first phosphor film 14 having red phosphor beads and the second phosphor film 15 having green phosphor beads was able to improve wavelength conversion efficiency.

EXAMPLE 8

Figure 8:
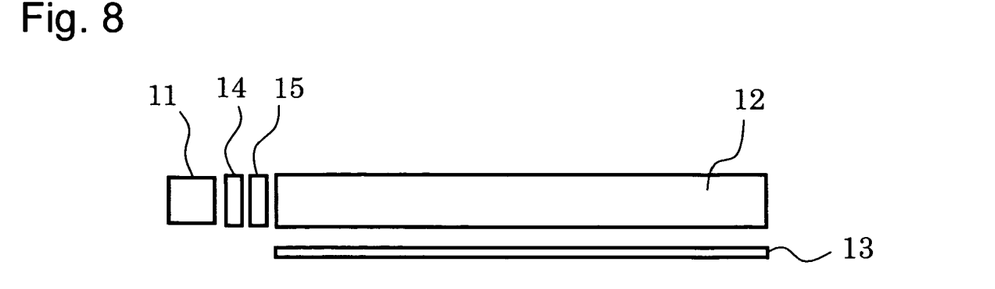
FIG. 8 is a schematic sectional view showing the constitution of the lighting unit according to the present invention.

FIG. 8 schematically shows the sectional structure of a lighting unit of this example. In this example, the first phosphor film 14 and the second phosphor film 15 were arranged between the light source 11 and the light incidence plane of the light guide plate 12. In this case as well, an improvement in wavelength conversion efficiency was attained by using red phosphor beads in the first phosphor film 14 and green phosphor beads in the second phosphor film 15.

In addition, in this case, the intensity distribution of light applied to the first phosphor film 14 and the second phosphor film 15 increases because the phosphor films are arranged near the light source 11. As a result, the intensity of light emitted after wavelength conversion by those phosphor films increases at a portion where the intensity of excitation light is strong, so color unevenness occurs upon color mixing inside the light guide plate. In view of the foregoing, the concentration of phosphor beads to be applied to a phosphor layer was reduced at a portion where the irradiation intensity of excitation light was large, and the concentration of phosphor beads to be applied to a phosphor layer was increased at a portion where the irradiation intensity of excitation light was small in such a manner that a ratio between excitation light and emitted light obtained as a result of wavelength conversion would be nearly constant.

In addition, a light source obtained by arranging an ultraviolet LED emitting near-ultraviolet light and a blue LED emitting blue light so as to be close to each other can be used as the light source 11. For example, an ultraviolet LED formed of a material such as GaN has a luminous wavelength of 365 nm. Accordingly, wavelength conversion can be performed with high efficiency because excitation energy with respect to a phosphor is high. However, it is not preferable to cause ultraviolet light to propagate inside the light guide plate 12 so that a phosphor is excited uniformly in a wide region because most of ultraviolet light is absorbed by a component of the lighting unit such as a polymer material constituting the light guide plate 12. Therefore, good efficiency can be obtained by: arranging a phosphor layer in a gap between an ultraviolet LED and the light guide plate 12 as shown in FIG. 8; and causing visible light after conversion to propagate inside the light guide plate. In addition, at this time, the use of silicon dioxide that absorbs ultraviolet light little as a water-impervious material constituting a phosphor bead can improve the utilization efficiency of ultraviolet light.

Figure 13:
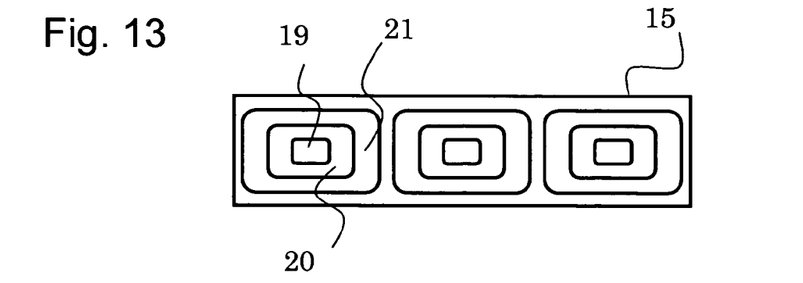
FIG. 13 is a schematic plan view showing the constitution of the phosphor film used in the lighting unit according to the present intention.

FIG. 13 is a plan view schematically showing the concentration distribution of phosphor beads to be applied to the first phosphor film 14 and the second phosphor film 15 when three light sources are arranged in parallel. In FIG. 13, regions 19, 20, and 21 are arranged in order of increasing concentration of phosphor beads. The region 19 corresponds to the luminance center of a light source, end has the strongest irradiation light intensity. Irradiation light intensity at a point weakens as the point is distant from the luminance center. In general, a phosphor has higher wavelength conversion efficiency and a larger number of conversion light components as irradiation light intensity becomes stronger. Therefore, illumination light having a uniform color distribution can be obtained by increasing the concentration of phosphor beads at a point as the point is distant from the luminance center of a light source. Such regions can be easily obtained by sequentially printing base materials having different phosphor bead concentrations by means of screen printing, offset printing, or the like using a printing plate corresponding to each region. The base materials having different phosphor bead concentrations can be easily produced by adjusting a mixing ratio between red phosphor beads or green phosphor beads and translucent beads to be mixed with the preceding beads. In FIG. 13, each light source has been divided into the three regions 19, 20, and 21; provided that an increased number of regions obtained as a result of division can provide an improved color distribution.

As described above, providing a distribution for the concentration of the phosphor beads of which the first phosphor film 14 and the second phosphor film 15 were formed in FIG. 8 resulted in a lighting unit having good color reproducibility and good color mixing property.

The use of an ultraviolet LED as a light source promotes the deterioration of a polymer material constituting the lighting unit and the deterioration of a liquid crystal component in a liquid crystal apparatus. Furthermore, the use of the ultraviolet LED adversely affects the eyes of an observer. Although not shown in FIG. 8, in this example, a UV absorbing film was inserted into a gap between the second phosphor film 15 and the light incidence plane of the light guide plate 12 to avoid the adverse effect.

EXAMPLE 9

Figure 9:
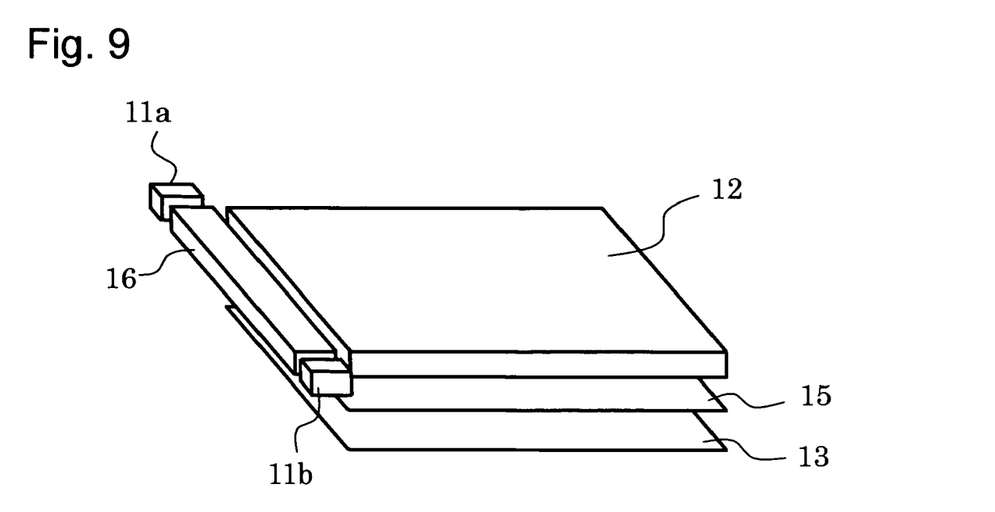
FIG. 9 is a schematic perspective view showing the constitution of the lighting unit according to the present invention.

FIG. 9 is a perspective view schematically showing the constitution of a lighting unit of this example. As shown in the figure, two blue light sources 11a and 11b are arranged on both side ends of a light pipe 16. Light emitted from each of those blue light sources propagates inside the light pipe 16 to be uniformized. Then, the light is deflected by a prism formed on the surface of the light pipe 16 opposite to the light guide plate 12 or the reverse surface, and is uniformly applied to the light incidence plane of the light guide plate 12 to be introduced into the light guide plate 12. In this example, red phosphor beads were mixed into the light pipe 16, and blue light was subjected to wavelength conversion in the light pipe 16 to be red light. Thus, uniform wavelength conversion and uniform color mixing were realized. In addition, efficient wavelength conversion was attained because blue light was repeatedly reflected in the light pipe 16 and had strong light intensity.

On the other hand, the second phosphor film 15 is arranged on the rear surface of the light guide plate 12. Green phosphor beads are uniformly arranged on the surface of the plate, or are uniformly mixed into the plate. Such constitution provided a lighting unit having good color reproducibility and excellent color mixing property.

EXAMPLE 10

Figure 10:
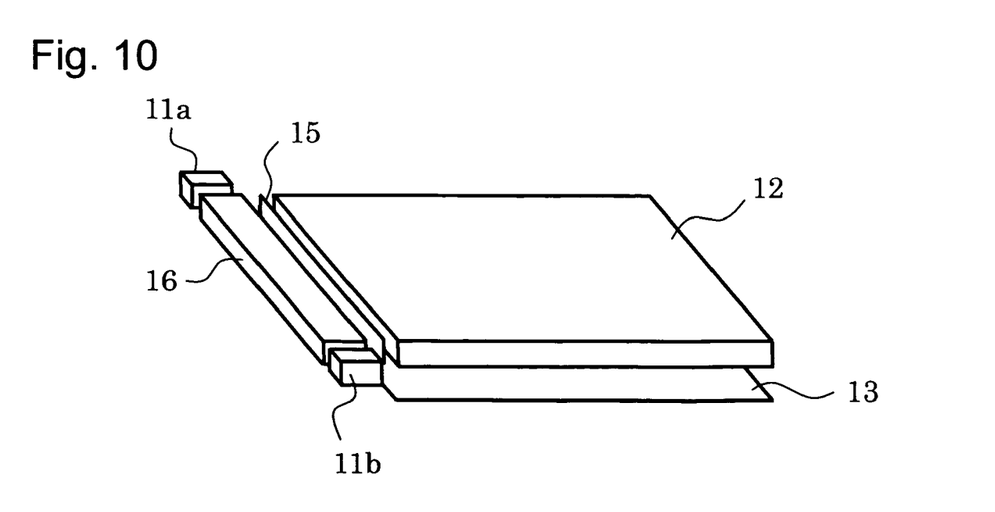
FIG. 10 is a schematic perspective view showing the constitution of the lighting unit according to the present invention.

FIG. 10 is a perspective view schematically showing the constitution of a lighting unit of this example. This example is different from Example 9 in that the second phosphor film 15 is inserted into a gap between the light pipe 16 and the light incidence plane of the light guide plate 12. As described in Example 9, the red phosphor beads mixed into the light pipe 16 subject blue light in the light pipe 16 having uniformity and strong intensity to red light efficiently. In addition, blue light and red light can be sufficiently uniformly mixed inside the light pipe. Furthermore, light emitted from the light pipe 16 to the light incidence plane of the light guide plate 12 is uniform. Unlike Example 8, it is sufficient that the green phosphor beads be uniformly applied to the surface of the second phosphor film 15 or uniformly mixed into the film. In addition, the efficiency of conversion of blue light into green light can be improved because the intensity of light applied to the second phosphor film 15 is strong as compared to Example 9. In addition, the area of the second phosphor film 15 can be reduced as compared to Example 9, so the amount of a phosphor to be used can be reduced, and a production cost for the lighting unit can be reduced. Thus, in this example as well, a lighting unit having good color reproducibility and excellent color mixing property was realized.

As described above, according to the present invention, a lighting unit having a long lifetime, a wide color reproduction range, and high light utilization efficiency can be realized, and the unit can be used in a good color liquid crystal display device. In addition, a chalcogenide-based phosphor having high luminous efficiency can be used without being deteriorated, so a high-luminance, long-lifetime liquid crystal display device can be realized. In addition, the color reproducibility of a device is improved, so a color liquid crystal display device with improved visibility can be realized.

What is claimed is:

1. A lighting unit comprising:
   a light source that emits blue light;
   a light guide plate through which light from the light source propagates so that the light is applied in a planar fashion;
   a green phosphor layer that converts blue light into green light;
   a red phosphor layer that converts blue light into red light, the red phosphor layer being separated from the green phosphor layer and arranged closer to the light source than the green phosphor layer;
   wherein the green phosphor layer includes green phosphor beads dispersed in a base material, the green phosphor beads each containing a plurality of green phosphor particles coated with hydrophobic material;
   the red phosphor layer includes red phosphor beads dispersed in a base material, the red phosphor beads each containing a plurality of red phosphor particles coated with hydrophobic material; and
   the maximum value for the average particle size of the green phosphor particles and the red phosphor particles is less than about one-fifth the size of the phosphor beads.

2. A lighting unit according to claim 1;
   wherein the green phosphor layer and the red phosphor layer are formed by printing the base material; and
   an area density of the green phosphor beads and the red phosphor beads dispersed in the base material is inversely proportional to a radiant intensity distribution of the light source.

3. A lighting unit according to claim 1; wherein the phosphor particles are a chalcogenide compound.

4. A lighting unit according to claim 1; wherein the average particle size of the phosphor particles is less than about 10 μm.

5. A light unit according to claim 1; wherein a light pipe through which light from the light source propagates so that the light is applied in a linear fashion is arranged on a side of the light incidence plane of the light guide plate;
   the red phosphor beads are dispersed in the light pipe which constitutes the base material; and
   the green phosphor layer is arranged between the light pipe and the light incidence plane of the light guide plate.

6. A display device comprising;
   a non-self light emitting display element;
   a light source that emits blue light;
   a light guide plate through which light from the light source propagates so that the light is applied in a planar fashion;
   a green phosphor layer that converts blue light into green light; and
   a red phosphor layer that converts blue light into red light, the red phosphor layer being separated from the green phosphor layer and arranged closer to the light source than the green phosphor layer;
   wherein the green phosphor layer includes green phosphor beads dispersed in a base material, the green phosphor beads each containing a plurality of green phosphor particles coated with hydrophobic material;
   the red phosphor layer includes red phosphor beads dispersed in a base material, the red phosphor beads each containing a plurality of red phosphor particles coated with hydrophobic material; and
   the maximum value for the average particle size of the green phosphor particles and the red phosphor particles is less than about one-fifth the size of the phosphor beads.

* * * * *